Feb. 17, 1942. H. F. FLOWERS 2,273,256
ELECTRICALLY POWERED LOCOMOTIVE DRIVE
Filed Oct. 17, 1939 4 Sheets-Sheet 1

Inventor
Henry Fort Flowers
By Mason & Porter
Attorneys

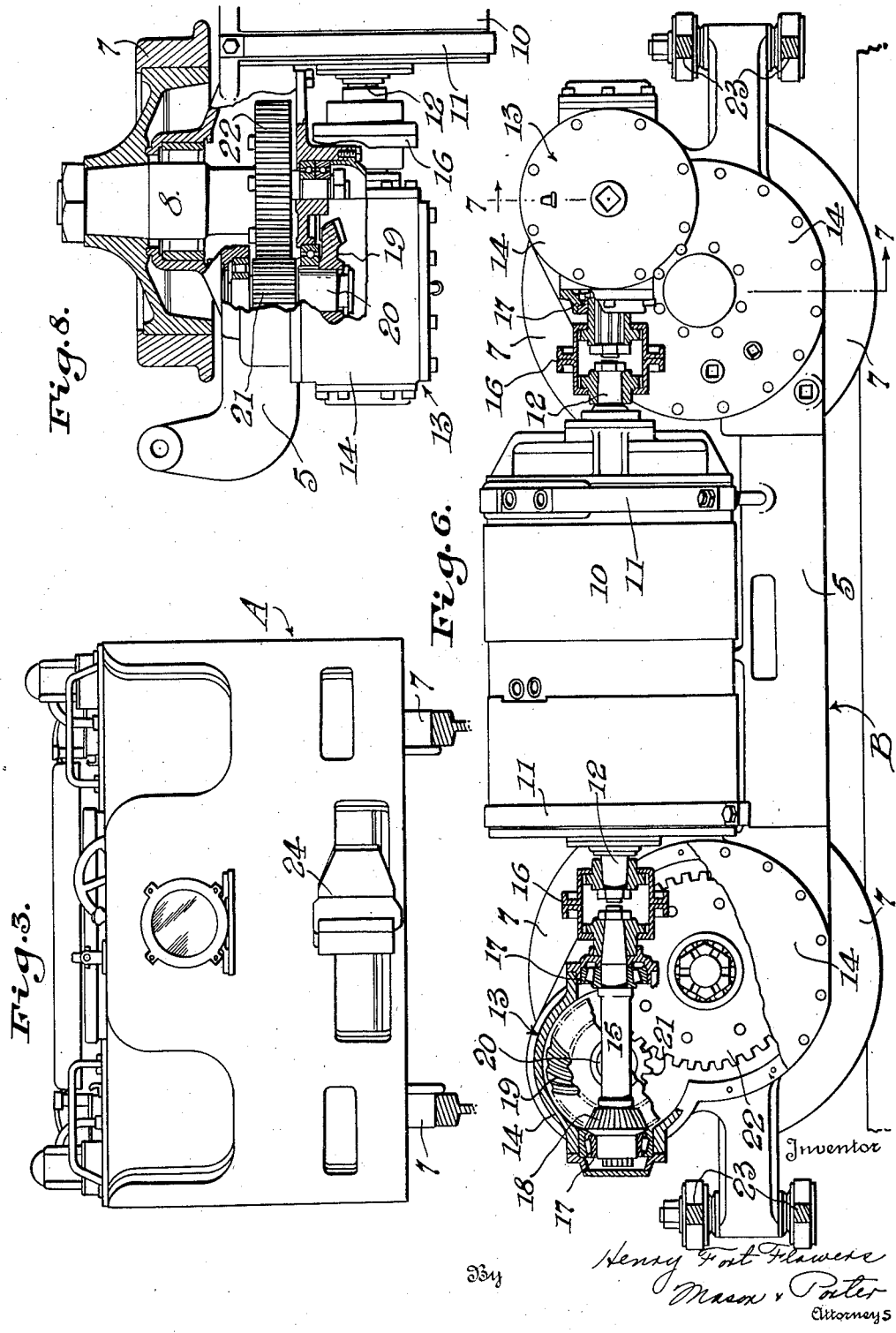

Feb. 17, 1942.   H. F. FLOWERS   2,273,256
ELECTRICALLY POWERED LOCOMOTIVE DRIVE
Filed Oct. 17, 1939   4 Sheets-Sheet 3
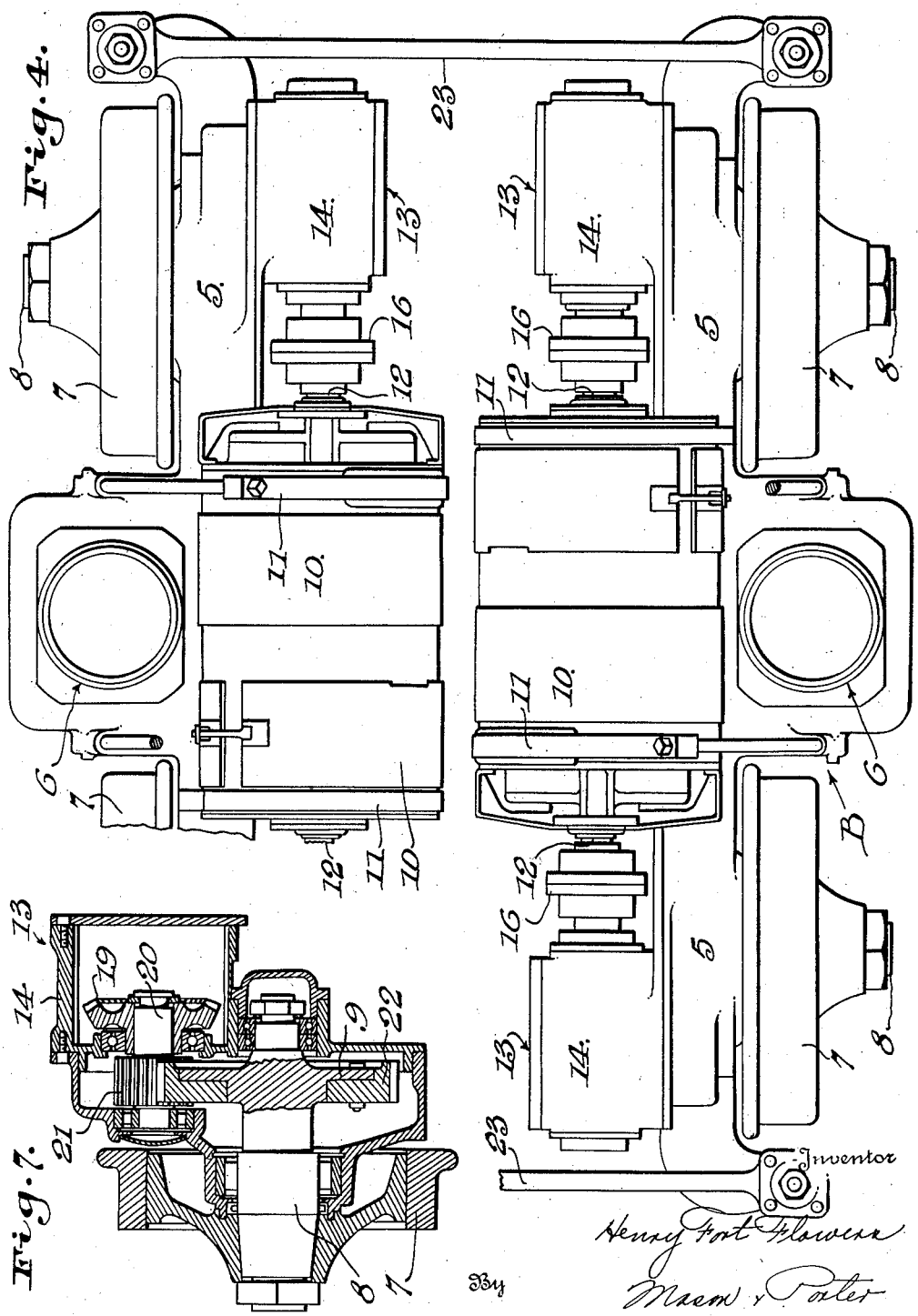
Inventor
Henry Ford Flowers
By
Mason & Porter
Attorneys Patented Feb. 17, 1942

2,273,256

UNITED STATES PATENT OFFICE 2,273,256

ELECTRICALLY POWERED LOCOMOTIVE DRIVE

Henry Fort Flowers, Findlay, Ohio

Application October 17, 1939, Serial No. 299,867

11 Claims. (Cl. 105—179)

This invention relates to certain new and useful improvements in electrically powered locomotives or the like and primarily seeks to provide a novel form and arrangement of tandem wheeled truck and drive mechanism therefor.

An object of the invention is to provide a novel truck structure for use on mine locomotives or the like, in which a minimum of space is provided between the spindle centers of the wheels disposed in tandem relation on each truck and at the same time to provide adequate space for power applying driving connections with said wheels.

Another object of the invention is to provide a novel truck structure in which the desired close spacing of the wheels is attained through the use of a novel double reduction gearing so formed and arranged as to allow the wheel spindles to be placed closer together than is possible in other known types of similar drive connections.

Another object of the invention is to provide an electrically powered locomotive capable of use on tracks having curves of short radii and individually mounted tandem wheeled drive trucks disposed in side by side relation thereon and joined together by connecting links or tie bars which cause the trucks to move in unison in rounding a curve, an individual motor being mounted on each of the link-connected trucks and disposed centrally between the axes of the tandem wheels with the axis of the motor drive shaft arranged parallel to the respective trucks.

Another object of the invention is to provide a locomotive of the character stated in which provision is made for increasing the tractive effort of the wheels relative to the tracks.

Another object of the invention is to provide a locomotive of the character stated in which the reaction of driving on the individual tandem-wheeled trucks is transmitted from one wheel to the other through the medium of reduction gear sets constructed and arranged in a novel manner for effecting a greater tractive effort to said other wheel so as to decrease any tendency of said other wheel to slip.

Another object of the invention is to provide a device of the character stated in which the driving connections of each truck include a motor, reduction gearing for each wheel including a first stage comprising bevel and ring gears, a second stage comprising pinion and spur gears, the second stage of each reduction gear being positively connected to each wheel of the truck.

Another object of the invention is to provide a device of the character stated in which means are provided for compensating for slight misalignment between the motor shaft of each truck and the driven shafts of the respective reduction gears.

A further object of the invention is to provide a device of the character stated which is simple in design, rugged in construction, and economical to manufacture.

With these and other objects in view which will more fully appear, the nature of the invention will be more clearly understood by following the description, the appended claims, and the several views illustrated in the accompanying drawings.

In the drawings:

Figure 3 is an end elevation.

Figure 4 is a top plan view of one truck assembly, an end of one truck being broken away.

Figure 6 is a vertical longitudinal section through a truck assembly with part of one reduction gear housing and flexible coupling broken away.

Figure 7 is a detail vertical cross section taken on line 7—7 of Figure 6 and shows the reduction gear.

Figure 8 is a fragmentary horizontal section taken at one end of a truck and showing the driving connections in detail.

Figure 2:
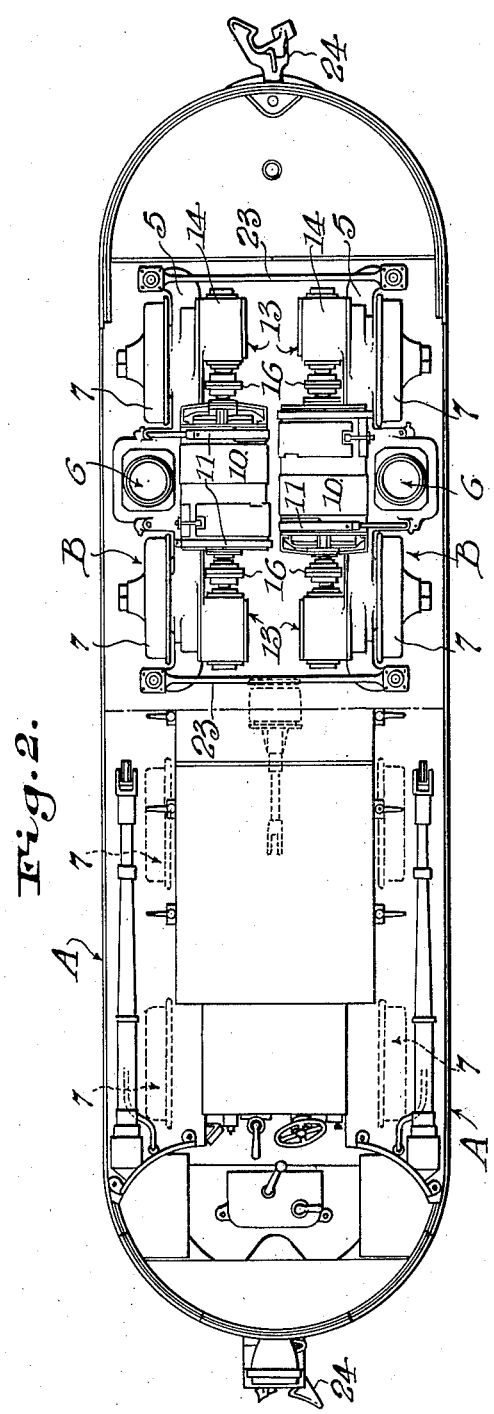
Figure 2 is a top plan view of the locomotive, parts being in horizontal section.
Figure 1:
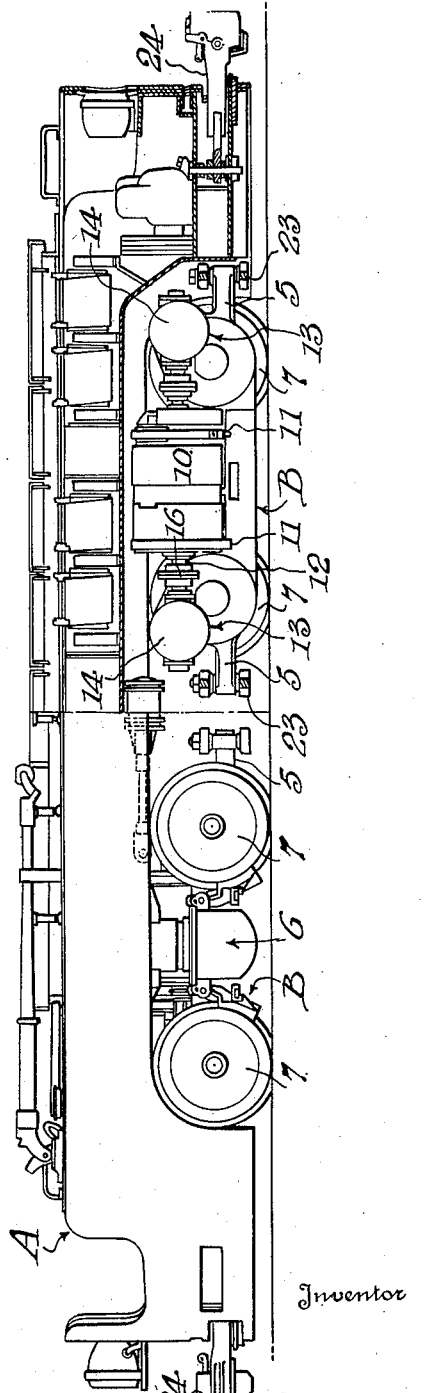
Figure 1 is a side elevation, partly in section, of an electric locomotive provided with tandem wheeled trucks constructed in accordance with the invention.
Figure 5:
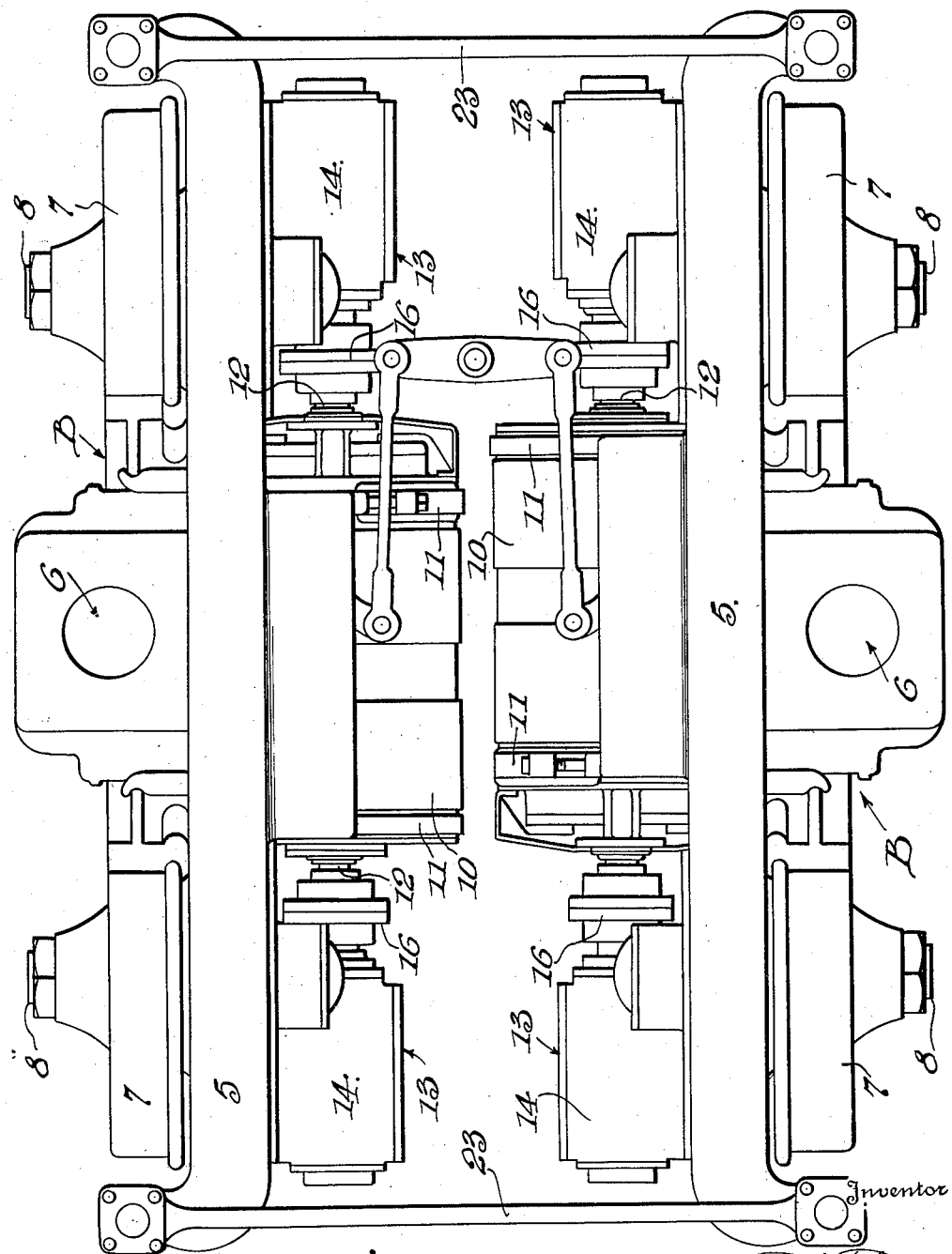
Figure 5 is a bottom plan view of one truck assembly.

In the drawings, the invention is illustrated as embodied in an electric locomotive including a frame A and four individual tandem wheeled driving trucks B arranged in pairs beneath the respective ends of the locomotive, with the opposed pairs connected together by cross links or tie bars.

Each truck B includes a frame 5 pivotally connected intermediate its ends to the main frame A through the medium of king post and socket connections generally designated 6. A pair of flanged wheels 7, 7 are mounted on spindles 8 journaled in the frame 5 adjacent the ends thereof. The inner ends of the spindles are provided with integrally formed flanges 9 for connection with the driving means.

The locomotive frame structure per se generally designated A, forms no part of the invention herein disclosed and claimed, this frame structure being disclosed and claimed in my co-pending application for U. S. Letters Patent, filed Oct. 17, 1939, Serial No. 299,866. The same is true of the king post mounting or gimbal structure herein generally designated 6. Any suitable king post mounting may be employed in the truck structure forming the basis of the present application which will permit the desired freedom of movement of the individual truck units. An example of mounting which will provide for the desired truck movement pivotally about the vertical king post axis, vertically on said king post, and rockably in the fore and aft or lateral directions, is to be found disclosed and claimed in my co-pending application for U. S. Letters Patent, filed May 20, 1939, Serial No. 274,847.

An electric motor 10, located intermediate the truck frame ends, is removably secured to said truck frame through the medium of bolt-tightened clamp straps 11. The motor includes a main shaft 12 which is disposed parallel to the truck frame and projects forwardly and rearwardly beyond the motor casing.

Power is supplied to the wheels from the adjacent ends of the motor shaft 12 through the medium of reduction gear sets generally designated 13 and each including a housing 14. Each reduction gear set includes a horizontal shaft 15 disposed in axial alignment with the motor shaft 12 and connected therewith by a flexible coupling 16. Each shaft 15 is journaled in spaced roller bearings 17 mounted in the respective gear housing 14 and is provided with a small spline-connected bevel spiral gear 18. The bevel spiral gear 18 meshes with a large bevel spiral gear 19 mounted on one end of a horizontal shaft 20 journaled in the gear housing 14 and disposed at right angles to the shaft 15. A small spur pinion 21 is mounted near the other end of the shaft 20 and meshes with a large spur gear 22 secured to the flange 9 of the respective wheel spindle 8. The bevel spiral gear 18 on one of the shafts 15 cooperating with the respective motor shaft 12 is disposed near the bearing 17 most remote from the motor, and the bevel gear 18 on the companion shaft 15 is disposed near the bearing 17 adjacent said motor so as to impart rotation in like direction to the wheels 7, 7 disposed in tandem relation.

It will be apparent that through the use of reduction gearing of the type described, the distance between spindle centers on the individual truck frames is kept to a minimum. This spacing is made possible by arranging the main gear elements of each reduction gear set disposed generally between the respective spiral bevel gears 18 and the associated driving motor 10 instead of being disposed generally beyond the said gears 18. This arrangement greatly facilitates the negotiation of curves of short radius.

As hereinbefore mentioned, each truck B is pivotally mounted on a king post assembly 6. The opposed trucks are joined together by upper and lower links or tie bars 23 extending transversely between the trucks and pivotally connected to the respective truck frame ends.

The locomotive frame A is provided with the usual front and rear couplers 24. The couplers are disposed in substantially the same plane as the king post connections to the individual tandem wheeled trucks indicated at 6 in order to reduce the overturning movement due to draw bar pull and driving torque, and to allow all wheels to have equal traction relative to the rails regardless of the direction of pulling.

It will be apparent also that by mounting the motors on the individual tandem wheeled truck frames, the torsional deflection in the couplings 16 is divided equally to positively drive the wheels in unison.

In the operation of electric locomotives using trucks of the herein described character, the driving force of the motors is transmitted to the track in a highly efficient manner. One of the advantages in connecting the two tandem wheels of each truck frame to the opposite ends of the same motor shaft is that the driving torque applied to the wheels tends to rotate the entire truck frame in the opposite direction. In other words, the reaction of driving is transmitted from one wheel to the other which tends to lift one wheel off the rail and transfer its normal weight to the other wheel. By having the two wheels geared together through the medium of the reduction gear sets 13, the wheel that has the reduced applied weight cannot slip until its companion wheel slips. Therefore, one wheel cannot lose traction without the other doing the same.

The above described feature, plus the fact that the wheels on one rail may rotate at a rate of speed different from that of the wheels on the other rail, as in rounding curves, has increased the effective tractive effort to such an extent that a 7-ton locomotive of the type herein described has proven in practice to be able to readily pull a train which could not be moved by a 10-ton 4-wheel, axle hung locomotive, of the type wherein two wheels are rigidly secured to the same axle.

Thus it will be seen that the herein described invention provides an electric locomotive of the tandem-wheeled axleless type which employs novel driving means for the individual trucks; in which the distance between wheel spindles on the individual trucks is reduced to a minimum so as to facilitate operation on short radius curves; in which the tractive effort of the drive wheels is materially increased; and which is simple in design, rugged in construction, and economical to manufacture .

It is of course to be understood that the details of structure and arrangement of parts may be variously changed and modified without departing from the spirit and scope of my invention.

I claim:

1. A traction vehicle including a main frame, a plurality of independent rigid truck unit frames, each of said truck unit frames being provided with a pair of wheels disposed in tandem relation, means for independently mounting said truck unit frames side by side on said main frame for pivotal movement about a vertical axis, for rockable movement fore and aft and laterally, and for movement up and down, a motor rigidly secured to each of said truck unit frames with its drive shaft projecting from the motor at both ends and disposed parallel to the plane of rotation of the wheels on the associated truck unit, and an individual intermeshing gearing set rigidly mounted on said rigid truck unit frame connecting each end of the respective drive shaft with one wheel of the associated truck unit to thereby positively drive said wheels.

2. A traction vehicle including a main frame, a plurality of independent rigid truck unit frames, each of said truck unit frames being provided with a pair of wheels disposed in tandem relation, means for independently mounting said truck unit frames side by side on said main frame for pivotal movement about a vertical axis, for rockable movement fore and aft and laterally, and for movement up and down, a motor rigidly secured to each of said truck unit frames with its drive shaft projecting from the motor at both ends and disposed parallel to the plane of rotation of the wheels on the associated truck unit, power transmitting means rigidly mounted on each rigid truck frame unit connecting each end of the drive shaft of the same motor with each adjacent wheel of its associated truck unit and comprising reduction gearing including intermeshing speed reducing bevel gears and intermeshing speed reducing pinion and spur gears cooperatively arranged to provide a compound reduction in the speed of rotation of said wheels relative to the speed of rotation of said motor drive shaft.

3. A traction vehicle including a main frame, a plurality of independent truck unit frames, each of said truck unit frames being provided with a pair of wheels disposed in tandem relation, means for independently mounting said truck unit frames on said main frame for pivotal movement about a vertical axis, for rockable movement fore and aft and laterally, and for movement up and down, a motor rigidly secured to each of said truck unit frames with its drive shaft projecting from the motor at both ends and disposed parallel to the plane of rotation of the wheels on the associated truck unit, power transmitting means connecting each end of the drive shaft of the same motor with each adjacent wheel of its associated truck unit, each such power transmitting means including a first relatively short shaft disposed in axial alignment with the adjacent end of said motor drive shaft and connected thereto by a flexible coupling, a small bevel gear mounted on said first short shaft, a second short shaft disposed at right angles to said first shaft, a larger bevel gear carried by said second shaft and disposed in meshing relation to said small bevel gear, a small pinion gear carried by said second shaft and adapted to mesh with a relatively large spur gear secured to the associated wheel to thereby provide a compound reduction in the rotative speed of said wheels relative to the rotative speed of said motor drive shaft and to positively drive both wheels of each truck unit.

4. A traction vehicle including a main frame, a plurality of independent rigid truck unit frames, each of said truck unit frames being provided with a pair of wheels disposed in tandem relation, means for independently mounting said truck unit frames side by side on said main frame for pivotal movement about a vertical axis, a motor rigidly secured to each of said truck unit frames with its drive shaft projecting from the motor at both ends and disposed parallel to the plane of rotation of the wheels on the associated truck unit, and an individual intermeshing gearing set rigidly mounted on said rigid truck unit frame connecting each end of the respective drive shaft with one wheel of the associated truck unit to thereby positively drive said wheels.

5. A traction vehicle including a main frame, a plurality of independent rigid truck unit frames, each of said truck unit frames being provided with a pair of wheels disposed in tandem relation, means for independently mounting said truck unit frames on said main frame for pivotal movement about a vertical axis, a motor rigidly secured to each of said truck unit frames with its drive shaft projecting from the motor at both ends and disposed parallel to the plane of rotation of the wheels on the associated truck unit, power transmitting means rigidly mounted on each rigid truck frame unit connecting each end of the drive shaft of the same motor with each adjacent wheel of its associated truck unit, each such power transmitting means including a first relatively short shaft disposed in axial alignment with the adjacent end of said motor drive shaft and connected thereto by a flexible coupling, a small bevel gear mounted on said first short shaft, a second short shaft disposed at right angles to said first shaft, a larger bevel gear carried by said second shaft and disposed in meshing relation to said small bevel gear, a small pinion gear carried by said second shaft and adapted to mesh with a relatively large spur gear secured to the associated wheel to thereby provide a compound reduction in the rotative speed of said wheels relative to the rotative speed of said motor drive shaft and to positively drive both wheels of each truck unit.

6. A traction vehicle including a main frame, a plurality of independent rigid truck unit frames disposed in opposed pairs, each of said truck unit frames being provided with a pair of wheels disposed in tandem relation, means for independently mounting said truck unit frames on said main frame for pivotal movement about a vertical axis, a motor rigidly secured to each of said truck unit frames with its drive shaft projecting from both ends and disposed parallel to the plane of rotation of the wheels on the associated truck unit, power transmitting means rigidly mounted on each rigid truck frame unit connecting each end of the drive shaft of the same motor with each adjacent wheel of its associated truck unit, each such power transmitting means including a first relatively short shaft disposed in axial alignment with the adjacent end of said motor drive shaft and connected thereto by a flexible coupling, a small bevel gear mounted on said first short shaft and located near the other end thereof, a second short shaft disposed at right angles to said first shaft, a larger bevel gear carried by said second shaft and disposed in meshing relation to said small bevel gear, a small pinion gear carried by said second shaft and adapted to mesh with a relatively large spur gear secured to the associated wheel to thereby provide a compound reduction in the rotative speed of said wheels relative to the rotative speed of said motor drive shaft and to positively drive both wheels of each truck unit, the ends of said opposed pairs of truck frame units being connected by transversely extending tie bars.

7. A traction vehicle including a main frame, a plurality of independent rigid truck unit frames disposed in opposed pairs, each of said truck unit frames being provided with a pair of wheels disposed in tandem relation, means for independently mounting said truck unit frames on said main frame for pivotal movement each about a vertical axis, a motor rigidly mounted on each truck unit, said motor being centered with respect to the wheel axes of said truck unit and including a drive shaft extended at each end and disposed parallel to the plane of rotation of the wheels, and individual gear sets rigidly mounted on each truck unit frame and connecting each shaft end with one wheel.

8. A traction vehicle including a main frame, a plurality of independent rigid truck unit frames disposed in opposed pairs, each of said truck unit frames being provided with a pair of wheels disposed in tandem relation, means for independently mounting said truck unit frames on said main frame for pivotal movement each about a vertical axis, a motor rigidly mounted on each truck unit, said motor being centered with respect to the wheel axes of said truck unit and including a drive shaft extended at each end and disposed parallel to the plane of rotation of the wheels, and individual gear sets rigidly mounted on each truck unit frame and including intermeshing bevel gears and intermeshing pinion and spur gears connecting each shaft end with one wheel, the meshing portion of said bevel pinion and spur gears being disposed outside the respective wheel axes in a fore and aft direction to thereby establish a relatively close spacing of the wheel axes on said truck units and facilitate travel over trackage having short radius curves.

9. In a traction vehicle, a rigid truck unit frame, a pair of wheels supported on said frame one at each end of the frame and engageable in tandem relation with a single supporting rail and with their axes parallel, a driving motor mounted on the frame with its drive shaft projecting from the motor at both ends and disposed parallel to the plane of rotation of the wheels, and rigidly mounted intermeshing gear couples connecting said motor and said driving wheels whereby driving force is applied to said wheels and each said wheel is held against slippage relative to the other of said wheels.

10. A traction vehicle including a main frame, a plurality of independent rigid truck unit frames, each of said truck unit frames being provided with a pair of wheels disposed in tandem relation, means for independently mounting said truck unit frames on said main frame for pivotal movement about a vertical axis, said last named means including a king post rigidly depending from the main frame between each pair of wheels disposed in tandem relation and of a length for having vehicle pulling force applied thereto at points below the horizontal plane occupied by the wheel axes, a motor rigidly secured to each of said truck unit frames, an individual intermeshing gearing set rigidly mounted on the respective truck unit frame and connecting the respective motor with each wheel of its associated truck unit, and draw bar connections disposed at points below the horizontal plane occupied by the wheel axes.

11. A traction vehicle including a main frame, a plurality of independent rigid truck unit frames arranged side by side in pairs, each of said truck unit frames being provided with a pair of wheels disposed in tandem relation, means for independently mounting each of said truck unit frames on said main frame for pivotal movement about an individual vertical axis, said last named means including a king post rigidly depending from the main frame between each pair of wheels disposed in tandem relation, a motor rigidly secured to each of said truck unit frames, and an individual intermeshing gearing set rigidly mounted on the respective truck unit frame and connecting the respective motor with each wheel of its associated truck unit.

HENRY FORT FLOWERS.